United States Patent
Wu et al.

(10) Patent No.: US 8,460,733 B2
(45) Date of Patent: Jun. 11, 2013

(54) HOT-FILL BEVERAGE PRODUCTION WITH FLAVOR INJECTION

(75) Inventors: Rei-Young Amos Wu, Palatine, IL (US); Richard Schutzenhofer, Naperville, IL (US); Osvaldo A. Chu, Sarasota, FL (US)

(73) Assignee: The Quaker Oats Company, Chicago, IL (US)

( * ) Notice: Subject to any disclaimer, the term of this patent is extended or adjusted under 35 U.S.C. 154(b) by 1456 days.

(21) Appl. No.: 11/399,286

(22) Filed: Apr. 5, 2006

(65) Prior Publication Data
US 2006/0286261 A1 Dec. 21, 2006

Related U.S. Application Data

(60) Provisional application No. 60/678,546, filed on May 6, 2005.

(51) Int. Cl.
*A23L 3/16* (2006.01)

(52) U.S. Cl.
USPC ............. 426/521; 426/590; 141/89; 141/91

(58) Field of Classification Search
USPC ............. 141/89, 91; 222/129, 129.1, 144.5, 222/145.2, 145.5, 148, 146.2; 426/231, 521, 426/590, 399, 412
See application file for complete search history.

(56) References Cited

U.S. PATENT DOCUMENTS

| | | | | |
|---|---|---|---|---|
| 4,534,991 | A * | 8/1985 | Kryger | 426/592 |
| 5,908,651 | A * | 6/1999 | Gustavsson et al. | 426/399 |
| 6,599,546 | B2 * | 7/2003 | Palaniappan | 426/231 |
| 6,742,552 | B2 * | 6/2004 | Raniwala | 141/103 |
| 2003/0070253 | A1 * | 4/2003 | Rolland | 15/404 |
| 2004/0084104 | A1 * | 5/2004 | Raniwala | 141/9 |

FOREIGN PATENT DOCUMENTS

WO    WO 01/38218    * 5/2001

OTHER PUBLICATIONS

Lewis, Michael; Heppell, Neil Continuous Thermal Processing of Foods—Pasteurization and UHT Sterilization. (pp. 59). Springer-Verlag. Online version available at: http://knovel.com/web/portal/browse/display?_EXT_KNOVEL_DISPLAY_bookid=942&VerticalID=0.*

* cited by examiner

*Primary Examiner* — Rena Dye
*Assistant Examiner* — Chaim Smith
(74) *Attorney, Agent, or Firm* — Banner & Witcoff, Ltd.

(57) ABSTRACT

A method and system for producing a flavored beverage wherein the flavor is added in a separate step to a combination of the base ingredients after the base liquid has been pasteurized by, for example, thermal heating. The flavor can be added to a continuous stream of the base liquid after a thermally processed hot-fill beverage base liquid is made up. A return loop conduit of the hot-fill beverage base liquid portion of the system is capable of diverting the heated hot-fill beverage base liquid in a stable state, that is, at the desired temperatures ready for continued beverage production, while the flavor may be switched over in a downstream flavor dosing portion of the system. The system may be used to produce a desired batch of flavored beverage by producing a first flavor, cleaning only that portion of the system to remove the first flavor and then changing over the flavor additive component to a desired second flavor.

17 Claims, 4 Drawing Sheets

HOT-FILL BEVERAGE PRODUCTION WITH FLAVOR INJECTION

CROSS-REFERENCE TO RELATED APPLICATIONS

This is a non-provisional application claiming priority on the basis of U.S. Provisional Application Ser. No. 60/678,546, filed on May 6, 2005, the entire specification of which is incorporated by reference.

FIELD OF THE INVENTION

This invention pertains generally to a method and system for hot-fill beverage production and more specifically to a system and method for producing beverages in which different flavors and/or other additives are added to a base hot-fill beverage liquid. The invention is more particularly directed to a method for manufacturing a beverage wherein a selected flavor is injected into a stream of the hot-fill beverage base liquid after the liquid has been pasteurized or commercially sterilized by heat treatment.

BACKGROUND ART

Many beverages are offered in different flavors, yet have a similar or identical base liquid to which the flavors have been added. In many such instances, a base beverage formula is first prepared and a flavor, color or other possible additive is added to the base liquid formula so as to achieve the desired flavored beverage for hot-filling in bottles. With all such hot-filled beverages, how and when these flavors and additives are added to the base liquid formula is related to a number of different criteria and conditions, including sensitivity of the flavors and additives to elevated temperatures.

With any such hot-filled beverages which are intended for wide commercial distribution, shelf stability and/or microbiological control are important considerations for the products after bottling, especially those which need not be stored or displayed under refrigeration. Products of this type can fall into two broad categories. The first category includes beverages which are filled into containers when the beverages are at elevated temperatures, and are referred to as hot-filled beverages. The other category includes beverages which are not filled hot but instead include a preservative component or composition. Thermal processing of beverages is considered advantageous as it stabilizes a formula microbiologically, while maintaining most of the desired sensory qualities. In contrast, preservatives formulations often have negative sensory attributes. The present invention is particularly directed to thermally processed beverages, that is, those beverages that are pasteurized by heat treatment and hot filled into storage containers.

Hot-filling is designed for packaging of liquids which must be placed in the container while the liquids are hot to provide for adequate extended shelf life in accordance with well-known principles. Usually this involves the use of heat to pasteurize or commercially sterilize the product. Typically, the heat effectively sterilizes or pasteurizes the beverage immediately prior to it being placed in the container in which the hot-fill beverage will be shipped. The container is filled with the hot, sterilized beverage. This also has the effect of sterilizing the container. After the usual hot-filling of the beverage into the container, the container then is capped, prior to shipping.

All of these methods and systems have one or another drawback. In particular, complete hot-fill beverage, including taste and flavor components, travels through the thermal processing and the hot-fill equipment in many prior art approaches. Since the flavor and "cloud" emulsion are sensitive to high temperature and shear force, the heat and pumping action induced to product at thermal process can adversely impact the flavor quality and "cloud" emulsion stability of the finished beverage. Also, it requires that all equipment be shut down and cleaned whenever there is a flavor change desired in the final hot-filled beverage product. Further, only one flavor can be produced at a time. For example, if a lemon flavored drink is being made and an orange flavored drink is scheduled to be made thereafter, the line needs to be shut down to clean all of the lemon flavor from the product mixing equipment, thermal processing equipment and hot-fill equipment before the orange flavored drink can be produced. Otherwise, the orange flavored drink will not taste right and/or will not give a consistently flavored product over the run for this beverage. This results in significant down time of the production line. For example, a typical line could have 3 or 4 or more flavor changes a day, with each flavor change having a typical down time of 20-30 minutes. Hence, somewhere between one and two hours or more of a typical production day (24 hr) are wasted down time while the equipment is being cleaned and flavor changes are effected.

Hot-filled beverages with flavor components therein are thermally processed in typical existing flavored beverage production, and some of the flavor in the beverage is lost, damaged or otherwise modified during heating at the elevated pasteurization temperatures. Furthermore, most flavors degrade within 10 to 15 minutes at elevated temperatures. Therefore, usual good manufacturing practices place a 10 to 15 minute limit on recirculation of beverages which are flavored. This can result in requiring a new batch to be prepared prematurely and due solely to a concern for flavor degradation/display without refrigeration, leading to waste and the need for disposal of hot-filled beverage that has not been capped within the required time limits.

The present invention is directed to a method and system for overcoming the drawbacks discussed above and includes an arrangement which produces multiple products having different flavors and possible other additive materials. These products exhibit shelf stability allowing them to be stored and displayed at room temperature and/or non-refrigerated conditions.

SUMMARY OF THE INVENTION

The present invention is directed to a method or process and a system for producing a flavored hot-filled beverage wherein the flavor is added in a separate step to a combination of the base ingredients of the beverage. In a preferred embodiment, the base ingredients are combined together, thermally processed and the hot-filled beverage base liquid is then injected with the flavoring materials and other additives, such as acidulants, either under pressure or by utilizing a Venturi effect. In an alternative embodiment, the base ingredients are combined together and thermally processed. The flavor is injected into the hot-fill beverage liquid after a reduction in the temperature and then the thermally processed ingredients are hot-filled into the container. Capping or sealing of the container typically follows these steps. The invention is also directed to the product of this process.

In another alternative embodiment, the inventive system and method provide for two separate cycles or loops, one loop being capable of isolating a portion of the system, i.e., the pasteurization step and heating arrangement, so that the remainder of the system may be maintained or dosers of flavor and ingredient materials may be switched over to provide for a desired hot-filled beverage. Ideally, the system is isolated in a return loop of the pasteurized beverage to a holding tank in which the hot-fill base beverage liquid is maintained at a constant predetermined pasteurization temperature.

The method and system of the present invention reduce down time for a flavor change in an industrial-scale bottling operation, as only the flavor dosing apparatus needs to be cleaned and not the whole system.

The method and system of the present invention also reduce flavor loss between flavor addition, filling and capping. Further, the dosing can occur just before the containers are hot-filled in a conveyer line, and immediately prior to capping. As a result, the beverage produced by this method provides for better and more consistent flavor of the hot-filled beverage.

The method and system of the present invention also allow for the production of more than one flavor on the same production line. For example, two or more flavor dosing assemblies could be used on the same line, each dosing assembly being charged with a flavor system different from the other doser or dosers, and the switch over from one flavor to another being effected by a simple opening and closing of valves, following a cleaning of the downstream system of the previous flavor.

The method and system of the present invention can also be used to add other ingredients which may be heat sensitive but which do not require thermal processing.

The method and system of the present invention avoids loss of flavor during thermal processing as the flavor is added after thermal processing of the base liquid. Consequently flavored beverages produced by this method have better flavor, in terms of intensity and stability, and other temperature sensitive additives injected into the beverage system are better able to retain their integrity.

With the method and system of the present invention, the filling process recirculation time limitation for flavored beverage not according to the invention is relaxed for the beverage base according to the invention, as there is no longer any worry about flavor degradation.

With the method and system of the present invention, the hot-fill base beverage liquid can be prepared in much larger batches, and relying on economies of scale, flavor materials can be more cost effectively purchased and used in bulk.

With the method and system of the present invention, less of the process equipment needs to be flushed with hot water to get rid of residual flavor during product flavor change-over. Significant advantages will result in resource sustainability in terms of savings in water and energy. It requires less fresh water and the energy for hot flushing the process line during flavor change-over procedures.

With the method and system of the present invention, less product will be left in the system during flavor change-over that needs to be flushed out, so that the product waste is minimized. Flushing is normally necessary to avoid mixing of different flavors in the final hot-filled beverage products.

DETAILED DESCRIPTION OF THE PREFERRED EMBODIMENT

Figure 1:
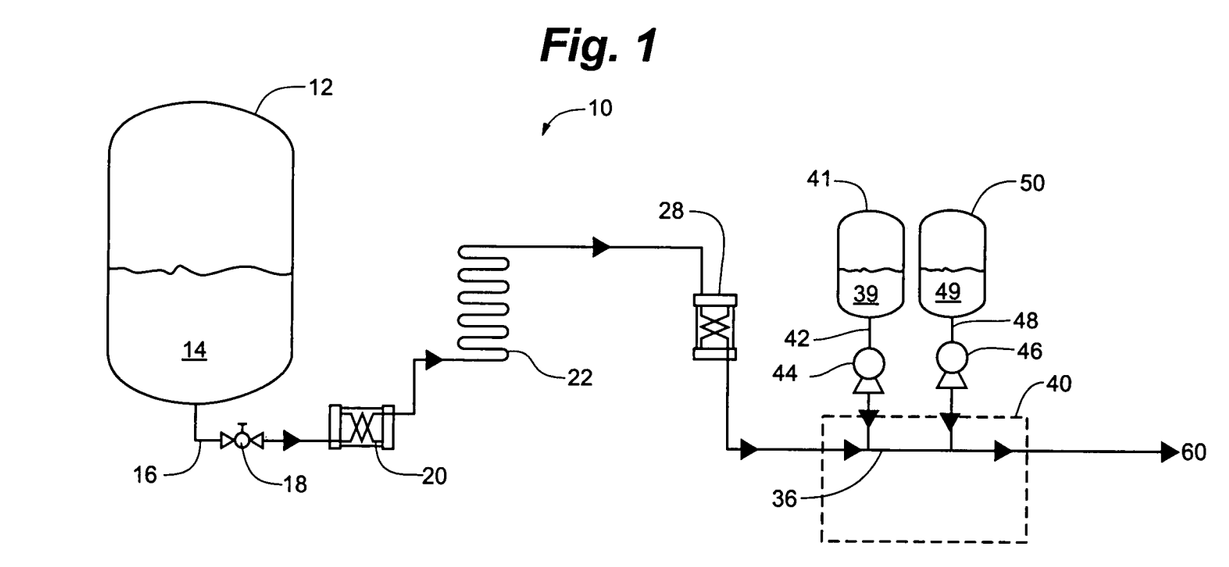
FIG. 1 is a block diagram of a first embodiment of the present invention.

A first embodiment of the present invention is illustrated in FIG. 1. As shown in FIG. 1, the essential components of the system for formulating a flavored hot-fill beverage are illustrated in a schematic or block diagram. The components themselves are generally known in the prior art, and will not be discussed in detail except insofar as they pertain to the present invention.

The system 10, according to the first embodiment, comprises a first blending tank 12, which in prior art systems was limited in size to approximately 10,000 gallons (37.85 m$^3$), due to the batch process utilized in the prior art systems. That is, in prior art systems, a batch is prepared in the tank, including all the ingredients, such as color and flavoring, materials which tank then provides a reservoir supply from which a liquid stream of flavored beverage is then extracted for further processing such as heat treatment for pasteurization or commercial sterilization and hot-fill bottling. As described above, this processing includes heating for sterilization of the complete flavored beverage recipe, including the temperature sensitive ingredients such as the color and flavor mixed in to provide the desired flavored hot-filled beverage.

The system illustrated in FIG. 1, in contradistinction, avoids heating the temperature sensitive ingredients beyond a predetermined temperature level, as will be discussed below, and because the blending tank 12 in the system 10 will be used to provide a reservoir of identical base liquid for all the different flavors, the tank 12 may be provided having much larger volumes than that of prior art systems, for example, on the order of 50,000-60,000 gallons (189.3 m$^3$-227.2 m$^3$), without affecting the taste or sensory characteristics of the hot-filled beverage to the consumer. This feature can reduce costs of production due to the economies of scale available for mass batch production.

As shown in FIG. 1, the blending tank 12 provides a location for initial mixing of a base hot-fill beverage liquid by adding a series of ingredients. The added ingredients can include both dry ingredients, which may be in the form of granules, a powder or other additive package, and wet ingredients, such as for example water or syrup, for the hot-fill base beverage. In order to be sure these ingredients are effectively combined, blending or mixing usually occurs, for example, by a paddle mixer assembly or other blending methods, including spiral flow path or recirculation loop, turbulence imparting members, such as static or dynamic blades, and other suitable impingement surfaces. The base beverage can be drawn off from the tank 12, as needed, drawing off the base beverage mixture by gravity or by positive pumping action and directing the fluid to the heater for thermal processing, as described below.

Alternatively, if a continuous process is used, the master base liquid mixture can be formed by adding the base ingredients, except the flavoring and other temperature sensitive materials, directly to a liquid stream in a conduit 16, thus forming the base liquid 14 by introduction and flow of the ingredients from a plurality of sources to a mixing station (not shown) in line with the conduit 16. To ensure that proper and desired proportions are present in the base hot-fill beverage liquid, one or more positive displacement pumps may be utilized in line with the feed conduits of the different ingredients, both in respect to the base liquid ingredients, and with respect to the flavor materials described below.

In either case, whether the base liquid is made up in a batch process or in a continuous process, the base hot-fill beverage liquid 14 passes through the conduit 16 in line through an optional cutoff valve 18 and is directed to a heater 20. Heater 20 utilizes a thermal process, for example, electrical resistance heating or a heat exchanger arrangement, so as to heat the base liquid 14 to a predetermined pasteurization/commercial sterilization temperature. Ideally, the heater 20 increases the temperature of the base liquid from about 90° F. (32.2° C.) to a preferred temperature of about 202° F. (94.5° C.) sufficient to sterilize the base liquid 14 and to render inactive the targeted heat resistant microorganisms. At this point, the base liquid 14 includes only those ingredients, for example, water, sugar, acid, sweeteners, etc., that are not subject to deterioration upon application of the heat of pasteurization.

The heater 20 is in fluid communication with a holding tube 22 that maintains the temperature of the fluid at the predetermined pasteurization temperature for a sufficient amount of time so that the base liquid is sterilized from commonly found microorganisms. Preferably, this temperature is about 202° F. (94.5° C.), but that temperature may be modified somewhat depending on the characteristics of the base liquid and/or the added ingredients that may be of a temperature-sensitive nature. The flavor component and/or color (or minor ingredients that do not need to be heat treated), are added at a mixing station 40 downstream of the base liquid, to form a master batch flavored mixture, which can be performed either within a suitable container or a predetermined location along a continuous beverage formulation line, similar to that described above in relation to forming the base liquid mixing. Ideally, the construction of the holding tube 22 retains the flowing base hot-fill beverage liquid at the required temperature for a time of between 3 seconds to about 1 minute so as to produce the desired sterilization or pasteurization by thermal treatment processes.

While the base liquid tank 12 is illustrated and described as a batch process, it is apparent to those having ordinary skill that the source of base liquid may be modified to provide the base liquid in a continuous process, as described above. However, the continuous process systems described above utilize high volumes of ingredients in producing the flavored beverages. If the cost savings incumbent with use of high volumes of ingredients are not sufficient to offset the risk of improper blending of the base liquid, it may be preferable to use a batch process for the added certainty of achieving the correct recipe of ingredient proportions to make up the flavored beverage. It is preferable to use a batch process as shown in FIG. 1 to avoid inconsistencies in the taste of the base hot-fill beverage liquid and maintain the design simplicity.

The mixing station 40 is shown schematically by the dotted lines, and may comprise nothing more than a conduit junction of the downstream section of conduit, designated herein as conduit 36, with one or more conduits 42,48 in fluid communication with a source of flowing and/or other temperature sensitive ingredients, contained, for example, in tanks 41,50, respectively. As set forth above, one or more metering devices, such as positive displacement pumps 44, 46, may be included in line in the conduits 42, 48. Optionally, each of the conduits may also include heating elements (not shown) for pasteurizing the flavor components before these are injected into the fluid stream of the base hot filled liquid in conduit 36, as will be described below in more detail.

Upon sterilization of the base hot-fill beverage liquid by maintaining the predetermined pasteurization temperature for the minimum period of time, the pasteurized base liquid 14 is directed to the flavor or mixing station, shown by dotted line 40. Optionally, as shown in FIG. 1, a trim cooler 28 is included in line in the conduit path, through which the base liquid passes before reaching the mixing station 40. The trim cooler reduces the temperature of the pasteurized base liquid 14 from the pasteurization temperature, e.g. 202° F. (94.4° C.) down to about 182° F. (83.3° C.), which is a more compatible temperature for addition of flavoring, coloring or other additive materials without overly affecting the sensory characteristics of these additives.

Following the base liquid preparation and pasteurization, the liquid in the conduit 36 reaches the flavor mixing station 40, where a flavor component adding apparatus or unit, such as a doser 42 or similar type equipment, adds a selected flavor component 39 to the thermally processed hot-fill beverage base liquid 14 present in the conduit 36. For commercial purposes, a six or seven head rotary doser can be used. A multi-head doser is advantageous in order for the flavor doser to retain flexibility during the operation for changing flavors, as needed.

Furthermore, if it is desired to produce more than one particular flavored beverage at a time, more than one dosing device may be used with each dosing device distributing a different flavor. Additionally, other ingredients, for example acidulants or other heat sensitive ingredients used in producing, for example, isotonic flavored beverages, may be used by injecting them from supplies by additional dosers, for example, an acidulant 49 contained in supply tank 50, shown in FIG. 1. The injection is preferably done under pressure to ensure more complete mixing of the flavor and additives with the hot fill beverage base liquid. However, other methods of injecting the flavor or additives are also possible, for example, by utilizing a Venturi effect. Preferably, the flavor is pumped through a narrow tube or quill protruding to the center of the transferring base beverage liquid in conduit 36. The preferred arrangement is to have the quill coming in at a right angle for easy access and maintenance. If the feed rate of the flavor or other additives injected into the unflavored base beverage liquid is at a high enough level, enough turbulence or eddy currents may be generated at and after the injection point so that no additional mixing is required, but the preferred method is to utilize a dispersion mechanism. Alternatively, an in-line mixing device, such as a static mixer, can be added to further improve the ingredient blending.

The flavor component may include a flavoring compound or composition and also may include a color or other desired additive material which cannot be included in the hot-filled beverage base liquid 14, but still comprises a feature of the flavor or sensory profile of the hot-filled beverage being formed. In a further embodiment, other materials such as vitamins or micronutrients, which do not need to be thermally processed, can be added in this step. Thus, the flavor component can comprise flavors and other ingredients which need not be subjected to full thermal processing to which the hot-fill beverage base liquid mixture is subjected in order to maintain shelf stability. The flavor material and other components added in this step are thoroughly dispersed and are stabilized by the heat of the base mixture in the filler supply tank. Preferably, the flavor component is injected into the material base mixture in the conduit 36.

In one aspect of this invention, the flavor components 39, 49 in tanks 41, 51, etc. may be susceptible to deterioration if heated to pasteurizing temperatures, and thus the flavor is retained in a sterile container prior to injection into the conduit 36. An alternative configuration may include pasteurizing heaters (not shown) in one or more of the conduits 42, 48, etc. These types of configurations may be especially appropriate for those flavor components that are not affected by the heat used to pasteurize the components. Thus, the flavor materials injected through conduits having such heaters, which may provide optional heating of the flavor components, permit the injection of flavors that are completely pasteurized into the stream of unflavored base beverage liquid passing through conduit 36.

Although the invention is described in the preferred form as having liquid flavor or micronutrient additives injected into the base beverage fluid stream, other modifications are possible. For example, injecting the flavor in solid form is contemplated by the invention. This may be performed by using an air lock mechanism and utilizing the flavor/micronutrient in tablets, or by injecting a flavoring by metered doses as a powder directly into the fluid stream of the hot fill base beverage liquid as it flows through the conduit 36.

The beverage in the tank then is ready for further processing, such as bottle filling, for example, at filler station 60. The bottle filling station or filler 60 is typically along the continuous beverage formulation line or involves transfer to the filler. The hot-fill filler 60 is a conventional one, such as one of the types noted above.

Figure 2:
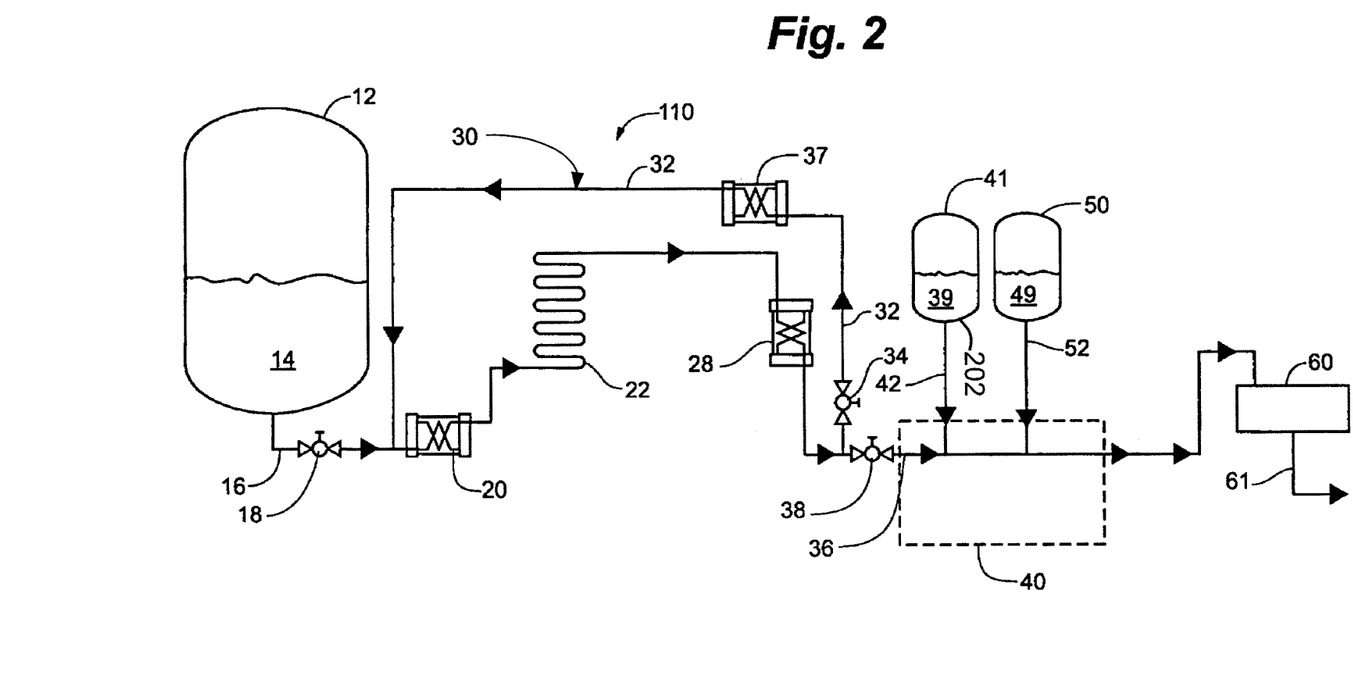
FIG. 2 is a block diagram of a second embodiment of the present invention.

In another embodiment of the present invention illustrated in FIG. 2, the hot-fill beverage base liquid 12 is prepared as described above as in the first embodiment. However, the difference in the embodiment of flavored beverage production system 110, shown in FIG. 2, is the introduction of a recirculation or return loop 30 which diverts the flow of the pasteurized base liquid 14 from proceeding further downstream toward the mixing station 40. The diversion of the base liquid 14 is accomplished by shutting off a valve 38 in line with conduit 36 between the junction of the conduit 36 with a divert extension conduit 32 and the mixing station 40, as shown. Simultaneously with shutting off valve 38, a valve 34, with the divert extension conduit 32, is opened, and the base liquid proceeds through conduit 32 to a junction with the first base liquid conduit 16 as shown. Preferably, that junction is located between the valve 18 and the heater 20.

This arrangement permits operation of the optional shut off valve 18, thereby stopping the introduction of any additional hot-fill beverage base liquid 14 from the tank 12. Thus the volume of the recirculating liquid in the divert conduit 32 is maintained in a constant ready state, while stopping the pumping of pasteurized base liquid 14 to the mixing station. Preferably, the divert extension conduit 32 includes an in-line divert cooler 37 for cooling the recirculating base liquid from the reduced temperature achieved by cooler 28, that is from 182° F. (83.3° C.) to a temperature closer to room temperature, that is, approximately 95° F. (35.0° C.). This cooling by the divert cooler 37 may be necessary to avoid excess temperature fluctuations in beverage base liquid entering the heat exchanger that would otherwise affect the system temperature control stability and possibly would affect the taste of the final beverage product.

The divert loop formed by conduit 32 maintains the recirculating liquid in a ready state for further processing. To revert back to normal processing of the hot-fill beverage, the valve 34 is closed, while simultaneously opening valves 18 and 38. This procedure will again revert the hot-fill base beverage liquid to be directed to the mixing station 40.

The period in which the base liquid 14 is recirculating in the divert loop 32 may be effectively used by the system operator to provide for any of a number of necessary operations to the system 110. For example, maintenance tasks of the system downstream of the divert junction, that is the junction of conduits 16 and 32, may be performed on a short term basis, while maintaining the system ready for beverage production almost immediately upon completion of the maintenance tasks. These tasks otherwise would have to be performed, as they were on prior art systems, by complete shutdown of the system, which then required recalibration of the system components to achieve normal operation following the shutdown.

Another task that can be easily performed during the recirculation of the hot-fill beverage base liquid 14 in the divert loop 32 is the change over in flavor components injected into the stream of hot-fill beverage base liquid, in conduit 36, at the mixing station 40. While only two tanks 41,50 are shown in FIGS. 1-4, the preferred configuration may take any of a number of forms, for example, as many tanks 41,50 etc. as there are desired flavors for the different flavored beverages desired to be produced by the system. Other alternative configurations or modifications to those described will be apparent to those having ordinary skill. For example, one or more of the above-described six or seven head rotary dosers may be used to provide the desired flavor or other heat sensitive ingredients by arranging the desired head or heads of the dosers to inject one or more of the ingredients into the stream of hot-fill beverage base liquid passing through the conduit 36.

After the hot-fill beverage base liquid 14 becomes flavored by the injection of the flavoring 39 or other ingredients, e.g. acidulant 49, the flavored pasteurized liquid proceeds to a bottle filling station 60, or a liquid storage facility (not shown). For example, instead of bottling the liquid, the flavored, pasteurized liquid can be stored in a sterile storage facility, such as a tank, tanker truck, or tanker railroad car, for eventual shipment and/or bottling at the same or another bottling facility at a later time.

Figure 3:
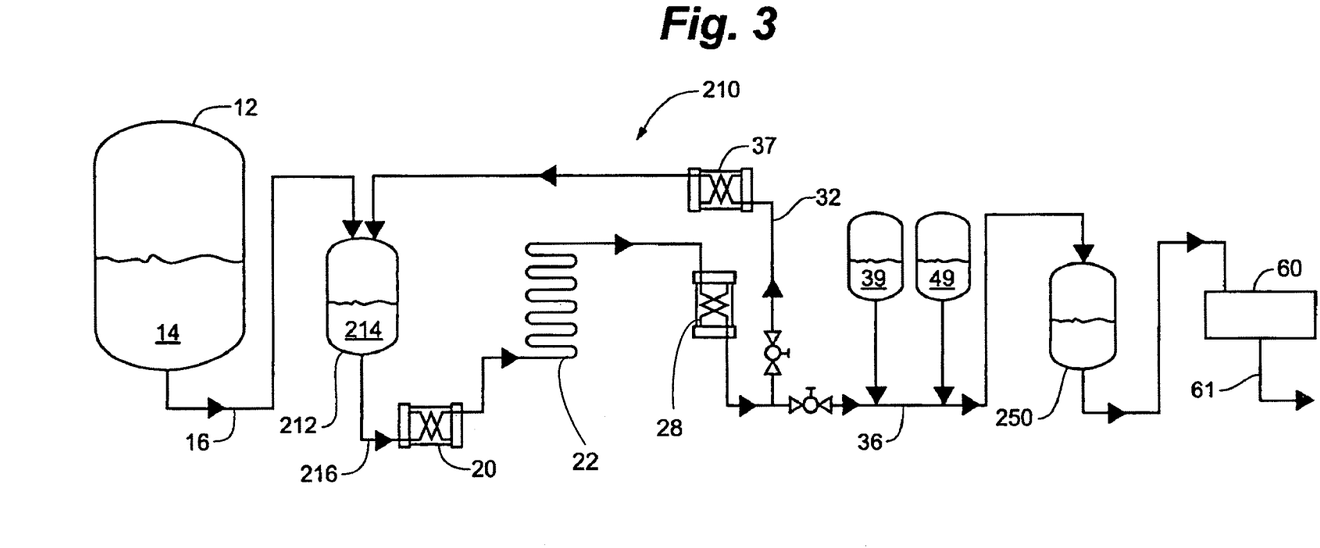
FIG. 3 is a block diagram of a third embodiment of the present invention.

Referring now to FIG. 3, another embodiment of the inventive system 210 is illustrated. Because many of the elements, for example, tank 12 and conduits 16, 36, are essentially identical in structure and function between the various embodiments, the identical identification numerals will designate the identical elements. Different elements between the different embodiments only will be separately discussed. With reference to the embodiment of the system 210 shown in FIG. 3, an additional element is illustrated in a balance tank 212, disposed in line with the first conduit 16 between the base liquid tank 12 and the heater 20, being connected by a conduit 216. Similarly, the return divert loop conduit 32 passing through the divert cooler 37 preferably empties into the balance tank 212 which retains the cooled down base liquid 214 as a smaller reservoir than the main base liquid tank 12. The size of the balance tank may be on the order of 600-800 gallons (2271-3028 liters), but may be modified for a smaller or larger volume, as needed, depending on balancing the need for a reservoir of sufficient volume to maintain a steady supply of hot-fill beverage base liquid 214 in the balance tank, with the desire to easily and continuously replenish fresh hot-fill beverage base liquid 214 drawn from the main base liquid tank 12.

Figure 4:
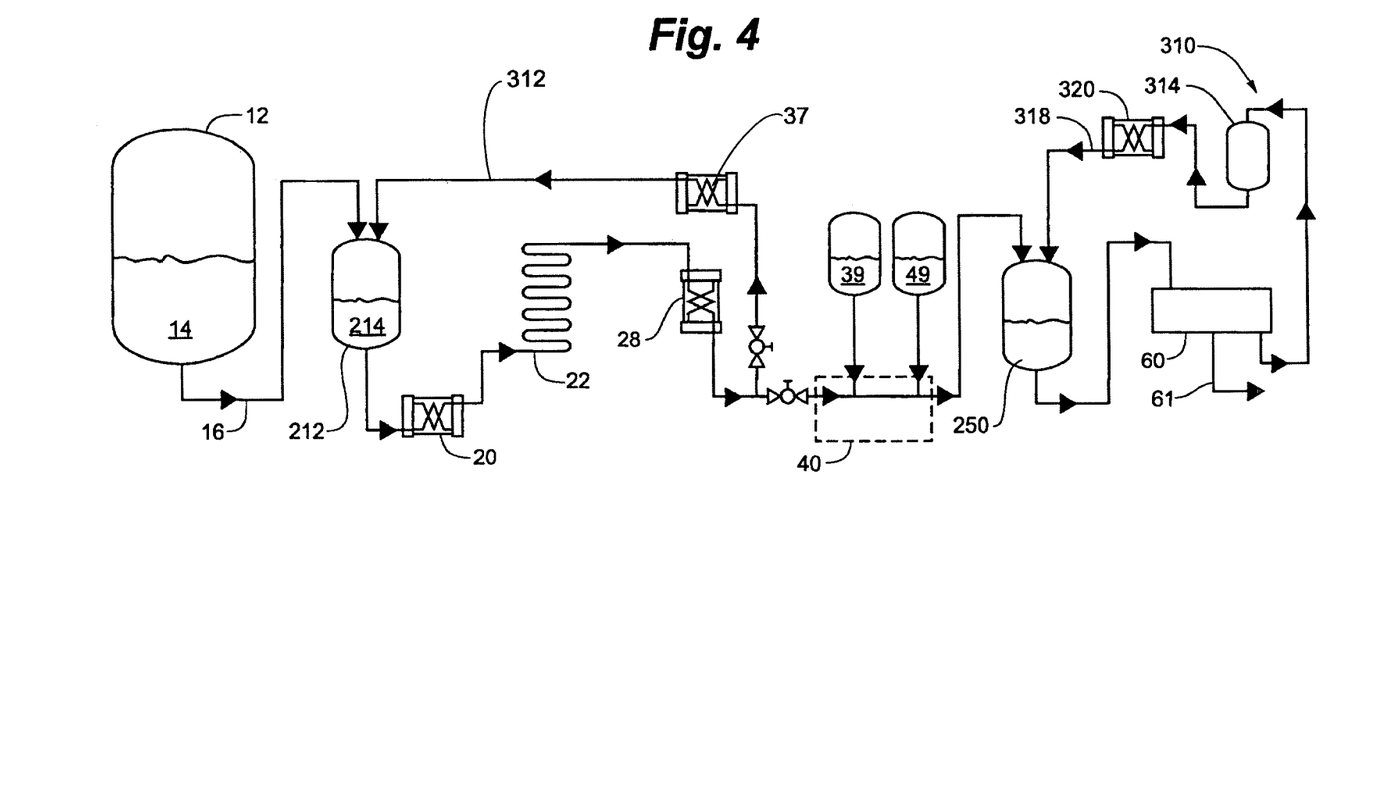
FIG. 4 is a block diagram of a fourth embodiment of the present invention.

A similar tank, referred to as a filler supply tank 250 is disposed in line between the mixing station 40 and the bottle filling station 60, which tank 250 provides a continuous and ready supply of pasteurized hot-fill beverage to the beverage storage or bottle filling facility. Use of a separate filler supply tank 250, as shown in FIG. 3, permits utilization of another preferable feature of the present invention. This feature is shown in FIG. 4, and illustrates yet another embodiment of the invention. A second return loop arrangement 310 connects the filling station 60 with filler surge tank 314 to return unused flavored beverage from the filling station back to the filler supply tank 250. This unused flavored beverage may result, for example, from overflow in the bottling process, which may be performed in order to ensure complete filling of the bottles. Also, in the process of filling bottles, the beverage must be maintained at a sufficiently high pressure and temperature to fill the bottles efficiently and with a rate that is suitable for mass production.

In order to maintain pressurization in the return loop conduit 312, connecting from out of the filling station 60, a surge tank 314 is necessary to receive the overflow and/or unused pasteurized liquid that is injected into the bottles, shown by the conduit 61. The surge tank 314 need not have as much volume as the supply tank 250, for example, about 250 gallons (0.95 m$^3$). The return loop includes a conduit 318 that connects from the surge tank 314 back to the filler supply tank 250. Preferably, the conduit 318 includes a top-up heater 320, in line with the conduit 318, which maintains the appropriate predetermined temperature of the pasteurized flavored beverage. For example, the heater 320 may slightly increase the temperature to match the temperature of the flavored beverage being received in the filler supply tank 250 from the mixing station 40. As set forth above, that temperature ideally is 182° F. (83.3° C.), which is sufficient to retain the flavored beverage sterile, without affecting its ingredients providing the taste, color and other characteristics.

Beverages prepared in accordance with this method and system typically are of the non-carbonated variety. They are formulations which are offered with a variety of flavor or sensory characteristics. Often they will include coloration components which typically vary with different flavoring regimes. Alternatively, the beverages which vary in flavor or sensory characteristics can have a consistent color. In accordance with the invention, these types of components which vary from one flavored beverage product to another are included in the dosing component which is not subjected to hot-filling. Other typical components and beverage products of these types include juices and teas. Juices and/or teas can be included at a variety of differing levels, depending upon the beverage product. A clear product would have no or very low levels of juices, juice concentrates or teas. These levels can be as low as about 0.1 weight percent for juices and about 0.02 weight percent for tea solids. A typical upper limit for tea solids is about 0.25 weight percent of the total beverage. While all juices could be virtually at any level, most products of the type discussed herein will be of the so-called dilute juice type, for example, one having no more than 40% by weight fruit juice in the total beverage composition. So-called juice products are characteristic of juice-containing beverages which are formulated with an array of flavors.

Sweeteners such as sugars, sucrose and high fructose corn syrup can be added at levels as high as 12 weight percent of the total weight of the beverage. So-called non-caloric or artificial sweeteners can be included either alone or in combination with sugars. For example, aspartame or sucralose may be present at a level as high as about 350 ppm (0.035 weight percent) of the flavored beverage composition. Other flavored beverages may include up to 200 ppm (0.02 weight percent) of acesulfame-K and/or up to about 200 ppm (0.02 weight percent) sucralose. These would be added as desired or needed for sweetness and caloric content.

Many flavored beverage products have a relatively low pH and/or can have an acidulant added, the most common acidulant in this regard being citric acid. A typical acidulant can be present at between 0.01 and 0.05 weight percent of the beverage weight. Beverages of this type can have a pH in the range of 2.0 and 5.5, depending on the type of product to be produced. A beverage product of moderate acidity could have a pH in the range of about 2.2 to about 6.4. A more acidic type of beverage would have a pH in the range of between about 2.3 and about 4.2, more preferably between about 2.8 and about 4.2.

Included within these beverages are so-called isotonic beverages. Beverages of this type include electrolyte and/or salt blend additions. Such additives often will be present at levels of between about 0.05 and about 0.2 weight percent, based on the total weight of the beverage. These can provide a source of important minerals such as potassium, magnesium and calcium. All of these additives may be added before or after the heat treatment step, depending on their sensitivity to temperatures.

Individual vitamins or vitamin packages can be included as desired. Typical vitamins in this regard include L-ascorbic acid (Vitamin C), alpha-tocopherol (Vitamin E), Vitamin A, various so-called B vitamins including riboflavin (Vitamin B2), Vitamin B6, Vitamin B12, pantothenic acid and other essential and non-essential vitamins such as Niacin. Carotenoids also can be included such as beta-carotene or provitamin A.

Depending upon the particular flavor or sensory characteristic of the flavored beverage according to the invention, clouding agents and the like can be included to give a different appearance and/or texture to the beverage. Anti-fungal agents also can be included to the extent needed for the particular beverage.

Certain flavor components can include emulsion and texturizer/stabilizer/thickener factors. Examples include agar-agar, gum acacia, gum arabic, carrrageenan gum, cellulose gum, esther gum, gellan gum, guar gum, locust bean gum, gum tragacanth, xanthone gum, glycerol esther of gum rosin and pectin and starch. Flavor regimes may be oil-in-water emulsions or contain emulsion systems as components.

Many of the beverage products made according to the method and system of the present invention contain significant quantities of water. Water contents can be as high as about 95 percent by weight. Non-juice beverages or dilute juice beverages will have at least about 60 weight percent water. These percentages are based upon the total weight of the flavored beverage product. The invention finds particular suitability for isotonic-type beverages, which typically have water content of 80 weight percent or above. An example of a product in this regard has between about 90 and 92 weight percent water. The so-called hardness of the water often will be controlled. Usual hardness levels for these types of products is in the low-to-moderate range, having no more than about 120 ppm of so-called hardness as calcium carbonate.

It will be understood that the embodiments and examples of the present invention, which have been described, are illustrative of some applications of the principles of the present invention. Numerous changes, alterations or modifications may be made by those skilled in the art without departing from the true spirit and scope of the invention. Thus, the above description is not to be considered limiting, but only is illustrative of the inventive concepts, the invention only being limited by the following claims and their equivalents.

What is claimed is:

1. A process for production of flavored hot-fill beverages comprising:

providing a continuous stream of a pasteurized or commercially sterilized base hot-fill beverage flowing through a transfer conduit, wherein the base hot-fill beverage flows into a balance tank disposed in-line with the transfer conduit between a base hot-fill beverage supply tank and a heater;

adding a first flavoring material directly to the base hot-fill beverage in the transfer conduit using a mixing station, wherein the mixing station includes a first doser to add the first flavoring material to the base hot-fill beverage in the transfer conduit;

directing the first flavored hot-fill beverage to a pasteurized hot-fill beverage storage facility for storing the hot-fill beverage;

following the directing of the first flavored hot-fill beverage, diverting the base hot-fill beverage to flow only through a diverting loop to maintain the base hot-fill beverage in the diverting loop in a ready state for further processing, wherein the diverting loop provides fluid communication from a section of the transfer conduit to the balance tank, and further wherein the diverting loop isolates the balance tank and heater from the mixing station and the pasteurized hot-fill beverage storage facility;

cleaning the transfer conduit of any residual mixture including the first flavoring material;

rediverting the transfer of the base hot-fill beverage to flow only through the transfer conduit following the diverting of the base hot-fill beverage and the cleaning of the transfer conduit;

following the rediverting of the base hot-fill beverage, adding a second flavoring material directly to the base hot-fill beverage in the transfer conduit using the mixing station, wherein the mixing station includes a second doser to add the second flavoring material to the base hot-fill beverage in the transfer conduit, and wherein adding the second flavoring material is performed following the adding of the first flavoring material; and directing the second flavored hot-fill beverage to the pasteurized hot-fill beverage storage facility for storing the hot-fill beverage.

2. The process according to claim 1 wherein the hot-fill beverage storage facility further comprises a bottle filling station for filling a plurality of bottles with the pasteurized, flavored hot-fill beverage and a plurality of bottles are filled with the flavored hot-fill beverage at the bottle filling station.

3. The process according to claim 1 wherein providing the continuous stream of base hot-fill beverage further comprises heating the base hot-fill beverage to a predetermined pasteurization temperature.

4. The process according to claim 1 wherein the loop diversion includes pasteurizing the base hot-fill beverage in the transfer conduit but does not include the mixing of the base hot-fill beverage with the flavor obtained at the mixing station.

5. A flavored beverage product made by the process of claim 1.

6. The process according to claim 1, wherein adding flavoring material directly to the pasteurized base hot-fill beverage in the conduit further comprises:

transferring the base hot-fill beverage to the mixing station through the transfer conduit; and mixing the base hot-fill beverage with the first flavoring material obtained from a first flavor supply in fluid communication with the mixing station also under pressure greater than the pressure of the base hot-fill beverage.

7. The process according to claim 6 further comprising:

removing the first flavor supply from fluid communication with said mixing station;

diverting the base hot-fill beverage to flow only through the divert loop;

cleaning the transfer conduit of any residual mixture including the first flavor;

rediverting the transfer of the base hot-fill beverage to flow only through the transfer conduit including the mixing station; and mixing the base hot-fill beverage with the second flavoring material obtained from a second flavor supply in fluid communication with the mixing station.

8. The process according to claim 6 wherein mixing further comprises injecting a flavor material into the flowing stream of base hot-fill beverage under pressure.

9. The process according to claim 6 wherein mixing further comprises injecting a flavor material into the flowing stream of base hot-fill beverage under pressure by using a positive displacement pump.

10. The process according to claim 6 wherein mixing further comprises injecting a flavor material into the flowing stream of base hot-fill beverage to precisely control the rate of injection of the base hot-fill beverage by means of flow metering controls.

11. The process according to claim 10 wherein injecting flavor material into the flowing stream of base hot-fill beverage is adjustable on a real time basis to precisely and continuously control the rate of injection of the base hot-fill beverage.

12. The process according to claim 6 wherein mixing further comprises injecting an acidulant material into the flowing stream of base hot-fill beverage under pressure.

13. The process according to claim 12 wherein mixing further comprises injecting the acidulant into the flowing stream of base hot-fill beverage under pressure by using a positive displacement pump.

14. The process according to claim 12 wherein mixing further comprises injecting the acidulant into the flowing stream of base hot-fill beverage using a Venturi effect.

15. In a process for production of flavored hot-fill beverages comprising:

producing a base liquid;

heating the base liquid to a predetermined pasteurization or commercial sterilization temperature at a base hot-fill beverage heating station, wherein the base liquid flows into a balance tank disposed in-line between a base hot-fill beverage supply tank and the base hot-fill beverage heating station;

transferring the base liquid to a mixing station through a first transfer conduit;

adding a first flavor material obtained from a first flavor supply in communication with a mixing station, wherein the mixing station includes a first doser to add the first flavor material to the base hot-fill beverage in the first transfer conduit, and wherein the first flavor material is added directly to the pasteurized base liquid in the first transfer conduit;

mixing the base liquid with the first flavor material thereby creating a first mixture;

transferring the first mixture to a filling station supply tank for supplying the heated first mixture to a bottle filling station through a second transfer conduit, wherein the filling station supply tank is disposed in-line between the mixing station and the bottle filling station, and further wherein the second transfer conduit includes a feedback loop extension in fluid communication with the filling station supply tank for returning an unused portion of the first mixture to the filling station supply tank;

filling the first mixture into bottles to produce a first batch of bottles containing a first flavored beverage;

following the filling of the first mixture into bottles, diverting the transfer of the base liquid to flow only into a loop that includes the base hot-fill beverage heating station but not the mixing station, wherein the loop provides fluid communication from a section of the first transfer conduit to the balance tank, and further the loop isolates the base hot-fill beverage heating station and the balance tank from the mixing station, the filling station supply tank, and the bottle filling station, and further wherein diverting the transfer of the base liquid maintains the base liquid in the loop in a ready state for further processing;

removing the first flavor supply from fluid communication with said mixing station;

cleaning the second transfer conduit of any residual first mixture including the first flavor;

rediverting the transfer of the base liquid to flow only through the first transfer conduit including the mixing station following the diverting of the base liquid and the cleaning of the second transfer conduit;

following the rediverting of the base liquid, adding a second flavor material obtained from a second flavor supply in communication with a mixing station, wherein the mixing station includes a second doser to add the second flavor material to the base liquid in the first transfer conduit, and wherein the second flavor material is added directly to the pasteurized base liquid in the first transfer conduit;

mixing the base liquid with a second flavor thereby creating a second mixture;

transferring the second mixture to the bottling station through the second transfer conduit; and transferring the second mixture to the filling station supply tank for supplying the heated first mixture to the bottle filling station through the second transfer conduit, wherein the feedback loop extension in fluid communication with the filling station supply tank returns an unused portion of the second mixture to the filling station supply tank;

filling the second mixture into bottles to produce a second batch of bottles containing a second flavored beverage.

16. The process according to claim 15, wherein adding flavoring material directly to the pasteurized base hot-fill beverage in the conduit further comprises:

transferring the base liquid to the mixing station through the first conduit under pressure; and mixing the base liquid with a first flavor obtained from a first flavor supply in fluid communication with the mixing station also under pressure greater than the pressure of the base hot-fill beverage.

17. A flavored beverage product made by the process of claim 15.

* * * * *